Patented Aug. 26, 1930

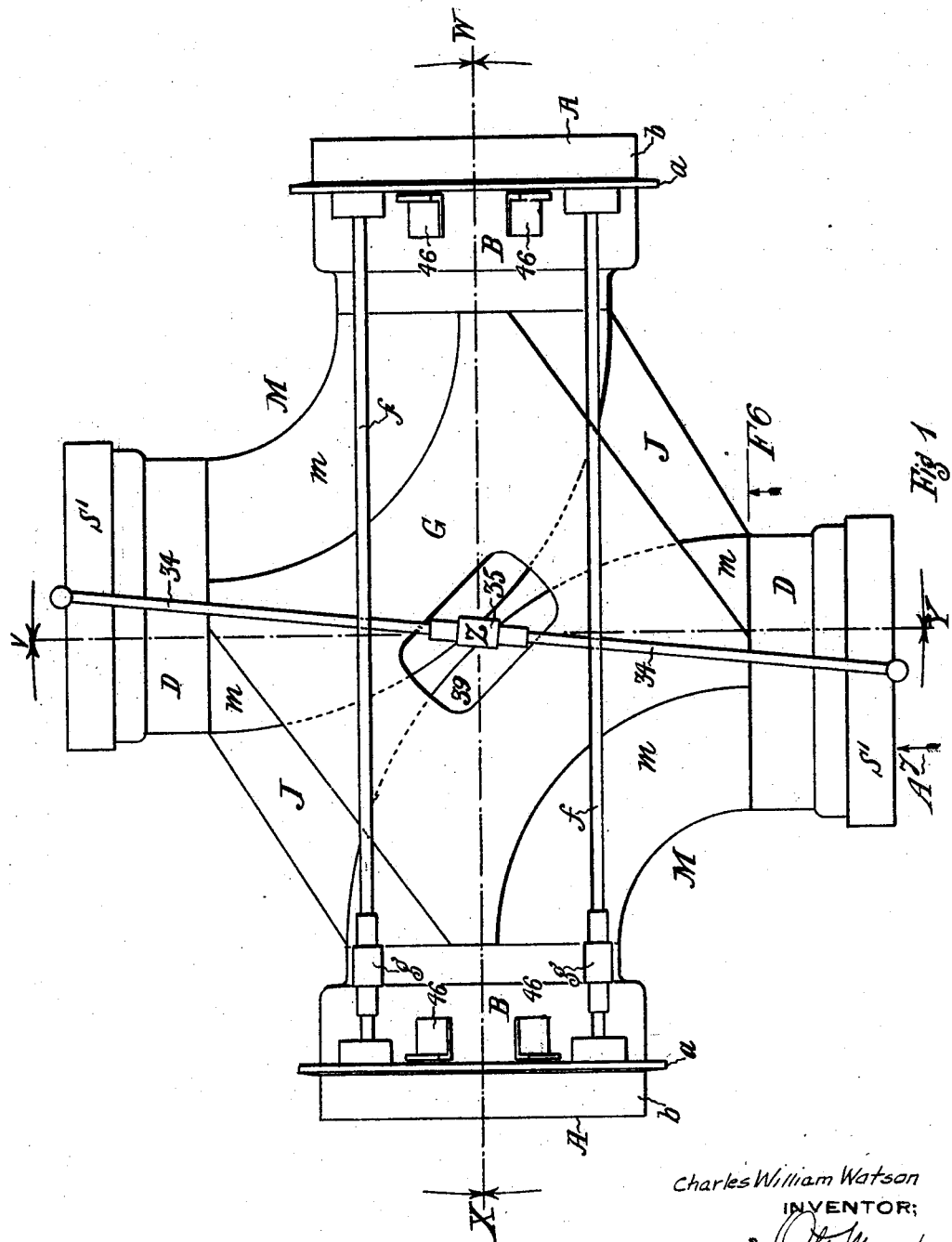

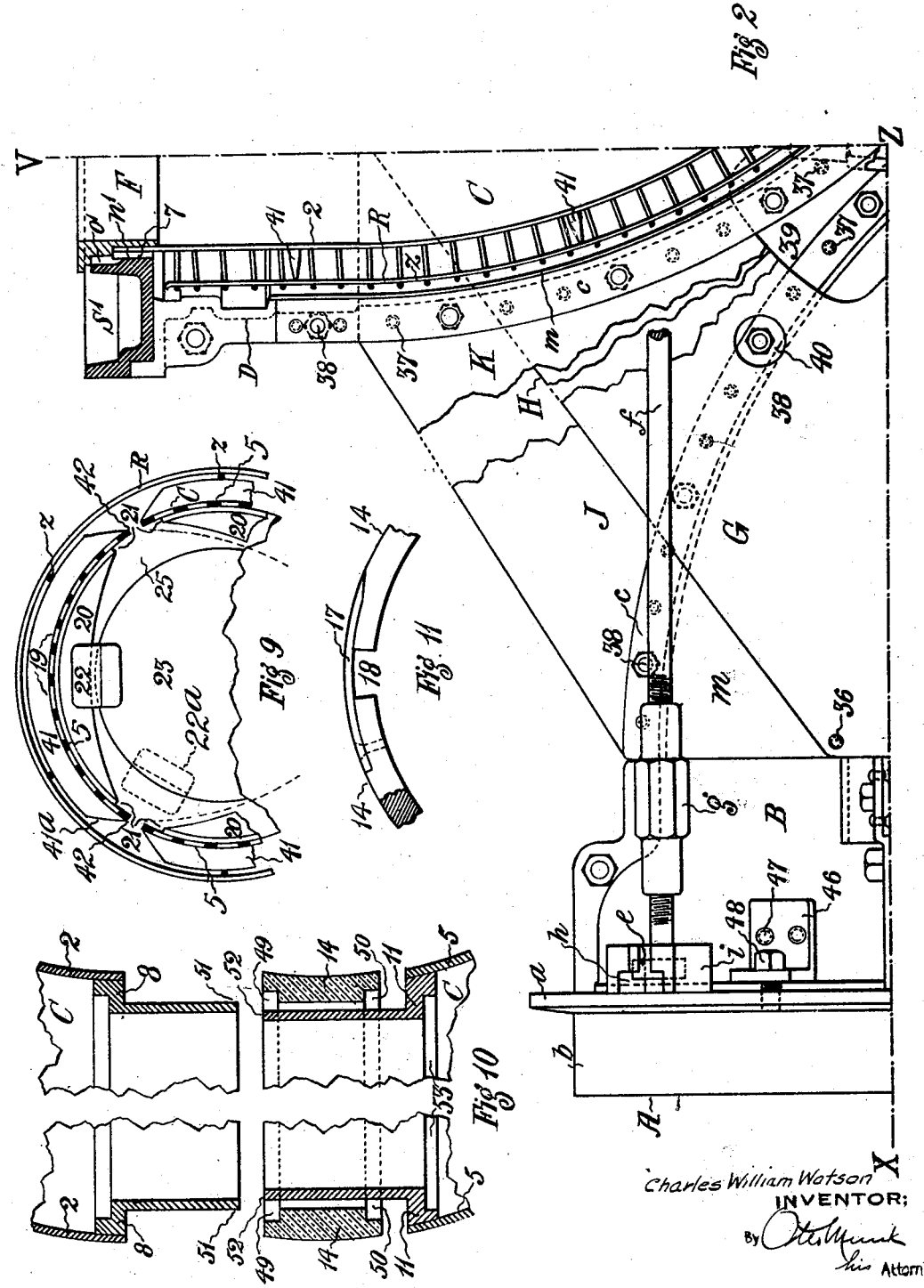

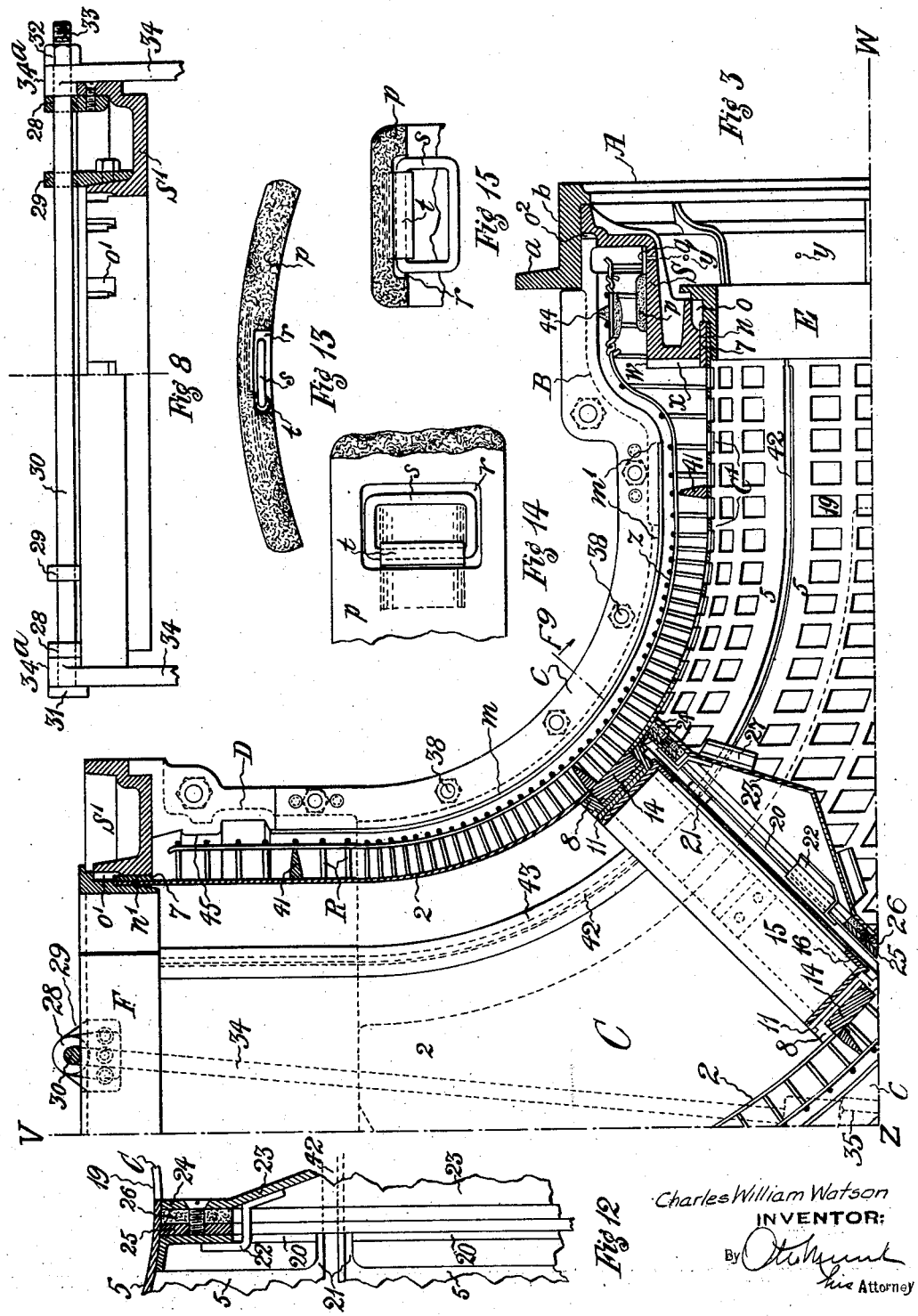

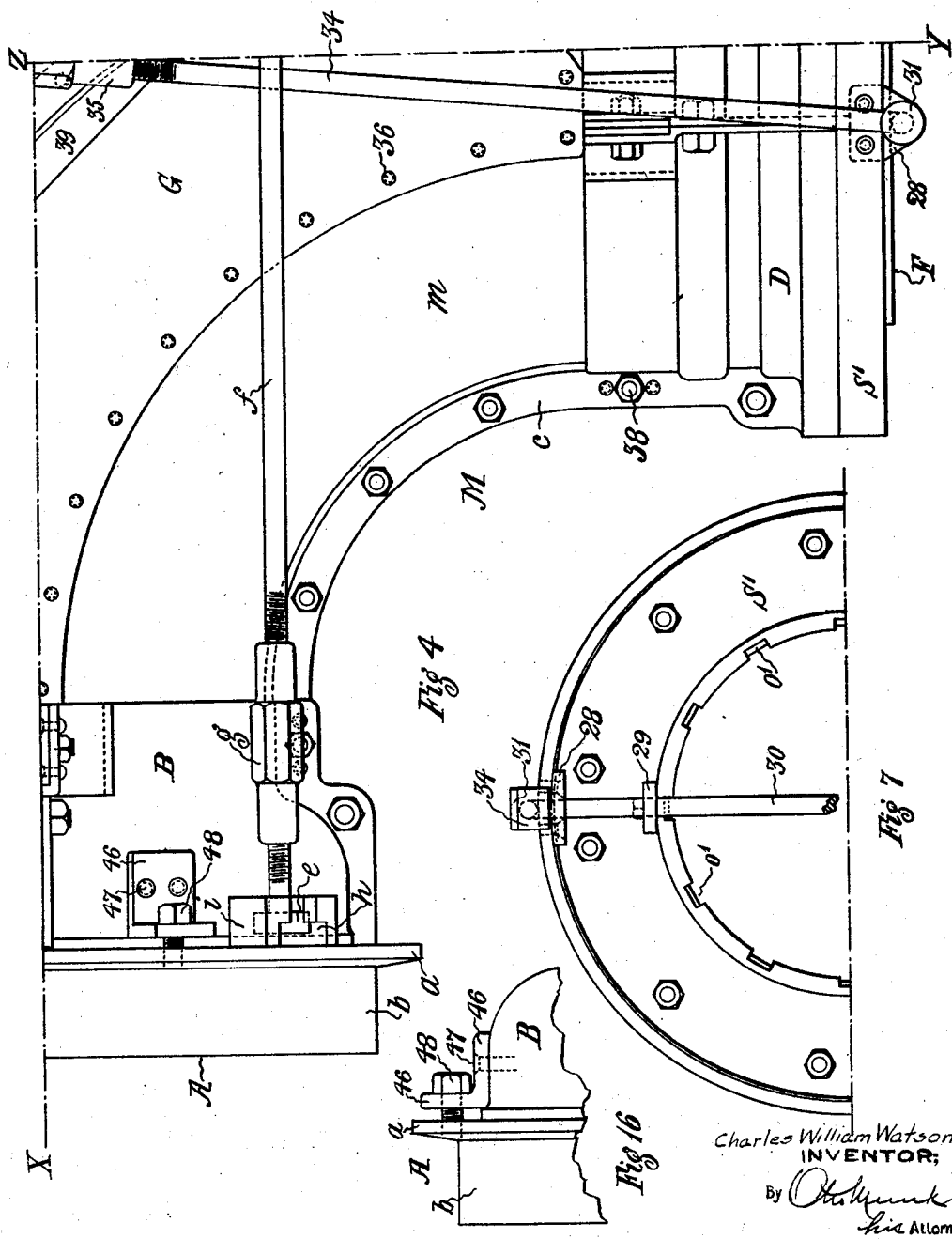

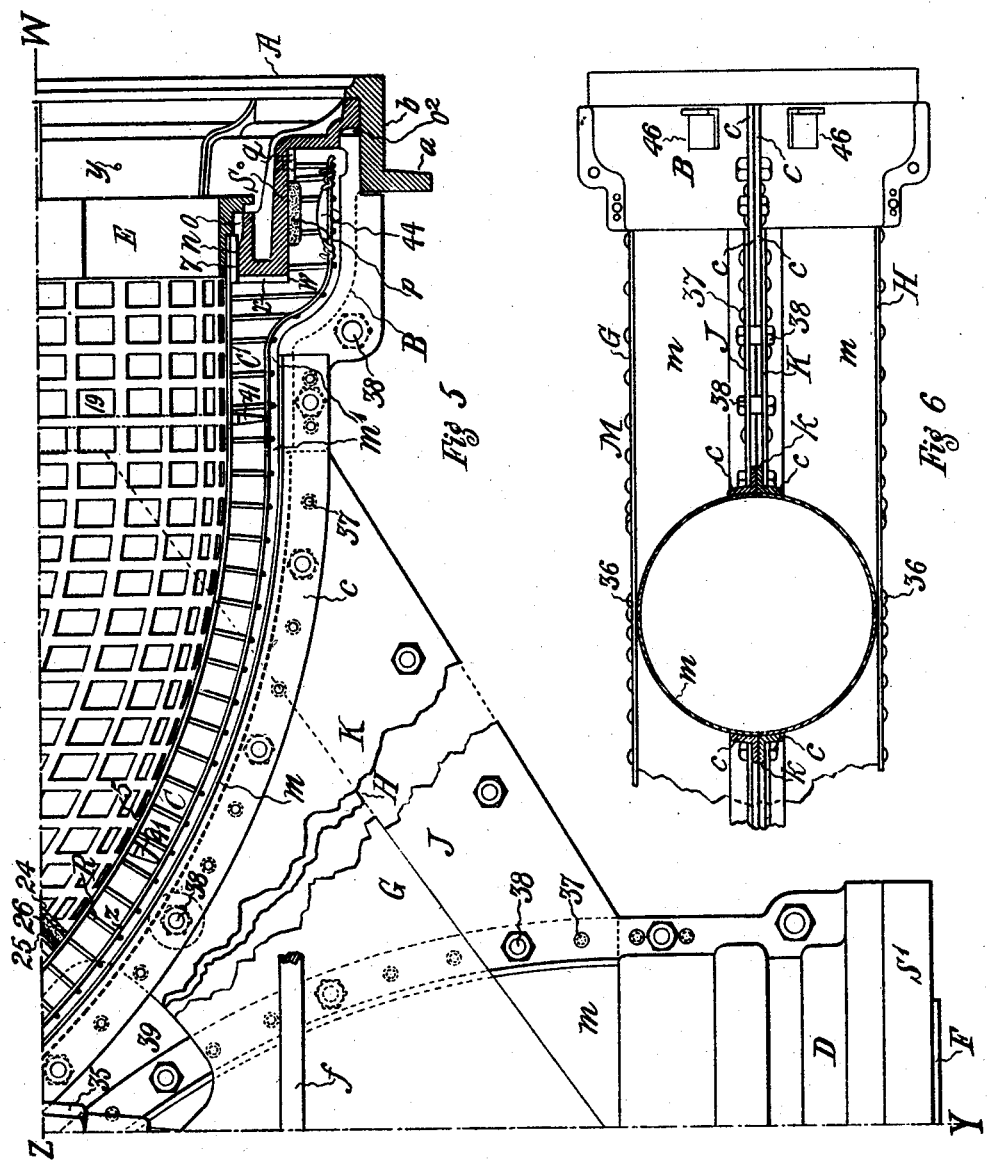

1,774,192

UNITED STATES PATENT OFFICE

CHARLES WILLIAM WATSON, OF ST. KILDA, VICTORIA, AUSTRALIA

METHOD AND APPARATUS FOR CENTRIFUGALLY PRODUCING STRUCTURES OF PLASTIC MATERIAL DEVIATING FROM STRAIGHT FORM

Application filed May 6, 1927, Serial No. 189,419, and in Australia May 24, 1926.

This invention relates to a process of manufacturing, centrifugally, hollow structures, principally pipes, which include a deviation such as a curved or angular bend or junction, or a plurality of deviations, the material used being cement agglomerate or other suitable plastic matter, with or without embedded reinforcement. The invention relates also to apparatus for using the process, and to resultant structures, including the producing of predetermined contours.

It is important that the position of the reinforcement shall be as predetermined, and consequently I provide devices which ensure that the reinforcement shall not become displaced or deformed while being embedded.

The invention is applicable in the production of hollow structures of various types and cross sections, as cylindriform, polygonal and ovoform.

In order to obtain equilibrium, or substantial equilibrium, moulding units (two for example) are symmetrically grouped and are rotated as one rotor.

In suitable cases I use a balancing mass or masses also. I cause agglomerate to be fed into the moulding units and to travel in courses herein described, to build up the structures partly retrogressively, and partly radially about an axis of rotation.

The moulding means of each unit includes outer and inner configuring members, called herein, for distinctiveness a mould and a core respectively, between which is a moulding space, or spaces, each mould and core being usually made of connected segments. The core segments in some cases have transverse divisions suitably united, and—for the travel of agglomerate into the moulding space or spaces,—the core is perforated according to requirements.

The agglomerate travels centrifugally into the moulding space or spaces, a deflector, which is preferably arranged angularly to the axis of rotation, conveniently ensuring differential feeding as hereinafter explained.

Any suitable stator is employable, for example one of known type by which centrifugal mechanism, termed a "rotor", is supported by rollers at each end, the drive being frictional or otherwise.

The devices for positioning reinforcement are carried by or on a formative part, such as a core, the reinforcement (held in position thereby) becoming covered exteriorly and interiorly with agglomerate of predetermined thickness. Reinforcement includes wire cages of suitable design, with longitudinal wires or members connected thereto. I may arrange the reinforcement and apparatus to enable fittings for offtakes to be incorporated and to enable offsets, inspection openings, ventilators, or so on to be provided. In this specification the term "structure" indicates any article to make which this invention is applicable. "Agglomerate" means cement, cementitious material, and the like, without or with reinforcement. The term "reinforcement" covers any suitable arrangement of material, which is for example coiled wire with attached longitudinal members combined by welding or otherwise.

In the accompanying drawings, which are diagrammatic, an embodiment of the invention is illustrated by way of example, applied to the manufacture of a pair of curved, also herein called deviating, pipes by means of my bi-unit rotor. The invention is not limited thereto, and details of what I illustrate and describe may be modified while keeping within the scope of my claims. Thus the illustrated spigot and faucet ends may be exchanged in positions relatively to the feed of agglomerate; and double spigoted, double fauceted, flanged, or other desired structures may be produced.

Figure 1 is a block plan of a bi-unit rotor which, in portions divided by lines XZW and VZY, is shown enlarged with further details in Figures 2, 3, 4 and 5.

Figure 2 is a view, partly in plan and partly in section, of the portion bounded by lines VZX.

Figure 3 is a section of the portion bounded by lines VZW.

Figure 4 is a plan of the portion bounded by lines XZY.

Figure 5 is a plan, partly in section, of the portion bounded by lines WZY.

Figure 6 is an elevation of portion of the rotor partly in section on line F⁶, Figure 1.

Figure 7 is an elevation of the end of part of a moulding element viewed according to arrow A⁷, Figure 1.

Figure 8 is a part section and part plan of a moulding element at the spigot end of Figure 3, viewed at right angles to that figure.

Figure 9 is a cross sectional view on about line F⁹, Figure 3, showing parts of a deflector and associated elements.

Figure 10 is an enlargement of part of Figure 3 showing parts of a core division joint, separated.

Figure 11 shows details of a contractible ring at a core division joint.

Figure 12 is an enlargement of part of Figure 3, and shows details whereby the deflector is secured.

Figure 13 is a cross section through part of a configuring ring.

Figure 14 is an interior face view of part of the said ring.

Figure 15 is a cross section through Figure 14, but with operating means in another position.

Figure 16 is a view of means connecting the mould shell to an annulus.

The units which are combined as one rotor, are shown as identical, and where similar structures are to be made they are so, or substantially so, each adapted to mould a pipe having a deviation or bend; and they may be modified to result in production of structures to which additions may be coupled or fitted.

Coupled to the mould shell of each unit is a rotor annulus A, having a roller path b flanged at a; the annuli being concentric with the axis of rotation XW. M are moulds, each having a shell m carried by configuring ends B, D, the shell and ends each being conveniently formed of a pair of united segments with jointing means, shown, see Figures 2 to 5, as angle irons c having flanges k connected by bolts 38.

C is the core. The mould shell and core are in some cases at each end straight as at m¹ and C¹ (Figure 3), to produce structures having ends which facilitate jointing, and setting in proper alignment, pipes or other structures. The mould halves are united by crown plates G, H, shown attached by rivets 36 (see Figures 4 and 6) along and to the crowns of the shells; and by web plates J, K, attached by rivets 37 (see Figures 2 and 5), to flanges k of angle irons c on each half mould. Bolting together of mould halves is effected, after staunching material, such as rubber insertion, has been applied between flanges k. The crown plates G, H, have apertures as 39, 40, to allow of access to nuts of bolts 38, and generally to facilitate fitting, and the operation of a coupling 35 hereinafter described.

The units—symmetrically arranged relatively to their common axis of rotation—are in some cases connected by tie-bars f having heads e and threaded couplings g, each head being housed in a chamber h having walls i carried by an annulus.

In addition to, or without using tie bars f, I pass studs 48 through flanges a and connecting plates 46, secured on the mould exterior by rivets 47.

Each unit has ends S, S¹, which together with mould ends B, D, are contoured to produce required configurations of the pipe or other structure. End S for example, configures the interior of a faucet, and end S¹ the end of a spigot. Parts B and D mould the exteriors of the faucet and spigot ends respectively, and are riveted to shell m. C is a core which, to facilitate its withdrawal, is divided transversely into parts which butt against or join an intermediate contractible ring 14. There are core divisions to suit the structure, which may include a plurality of curves, each division including longitudinal segments, the illustrated core having three segments 2 and three segments 5, see Figures 9 and 10, segments 2 forming one division, and segments 5 another. For uniting core divisions the inner end of each segment 2 carries (see Figure 10) an arc 8, and the inner end of each segment 5 carries an arc 11, the arcs when assembled overlapping. There is a contractible ring 14 embracing arcs 8, while an inner expandible ring 15 (Figure 3) presses arcs 11 outwardly, so that parts 8 and 11 are firmly held together. Ring 14 has a gap 18 with means, such as an overlapping tongue 17 covering the gap to prevent agglomerate entering the core interior, and affecting the rotor equilibrium. To allow of easy withdrawal of the ring 15, it has a flange 16, the ring seat being marked 53 in Figure 10. The elements described unite the parts of the transversely divided core, and produce a continuous collapsible moulding element.

Ring 14 has annular recesses 49, 50, whereby when arcs 8 are assembled, if parts become locked together, a lever may be inserted in recess 50 to dislodge the ends 51 of said arcs 8 after removing parts 5 and 11.

Similarly, a lever may be inserted in recess 49 to dislodge the ends 52 of arcs 11 if parts 2, 8, are first removed. In a tapering structure, such as a pipe reducer, the core need not necessarily be segmented, but segmented construction is preferred if the structure is not straight. At its external end each segment is strengthened (see Figure 3), by, for example, a plate 7 which when the core is assembled rests in a seat, n, n¹, respectively, of the ends S, S¹. Core segment outer ends are held in operative position relatively to ends S—S¹ by expandible locking rings, E and F respectively. To prevent dislodgement of rings F by centrifugal force, lugs 28, 29, are, (see Figure 8) secured to each end S¹, and carry a suitably held transverse bar 30 which is shown with a head 31, and secured by nut 32 and split pin 33. Pivotally carried at each end of bar 30 is the head 34ᵃ of a tension or tie bar 34, having parts united by oppositely threaded couplings 35 (Figure 1) the other ends of such bars being carried as by the corresponding bar 30 of the adjacent unit.

Each segment 5 has an area which is perforated at 19 according to requirements, the perforations extending to a deflector 23 appropriately located. Each said segment carries a plate 20 (Figures 9 and 12), the assembled plates having clearances 21 between their ends, to permit of plates 22 carried by the deflector being inserted and located to grip plates 20 upon the deflector being rotated to the position in Figure 9. The position of plate 22 before rotation is indicated by dotted lines at 22ᵃ. This form of joint is shown by way of example.

The deflector has hand grips 27 to facilitate rotation for securing and releasing purposes. A deflector, the surfaces of which extend suitably relatively to the axis of rotation, is shown as coned, by way of example, but it may be of any other suitable contour.

The deflector is illustrated with a flange 24, adjoining the core joint described, but it is locatable elsewhere relatively to the feed entrance for plastic material, to suit requirements, the perforated area being varied accordingly. To prevent liquid or other material fed in leaking past the deflector, a ring 25 is secured to the flange 24 as by screws with intermediate packing or staunching material 26.

As is evident, the core perforations, in Figure 5 at the ends of the major radii, have an aggregate area greater than those at the ends of the minor radii, Figure 3. Radial lines are not illustrated, their positions being obvious. Core perforations may be varied in area and disposition relatively to the aggregate areas of the core perforations at the ends of radii aforesaid, to ensure differential quantity feeding of agglomerate to the moulding area or areas, the distribution of the material fed being facilitated by the gyrations of the deflector about the axis of rotation.

To facilitate removal of core segments, ends S, S¹, have recesses o, o¹. Recesses o² (shown in S, Figure 3) are also provided in ends S, S¹, to facilitate separation of said ends from configuring ends B and D, by the insertion of a lever. To allow core segments to clear each other when being collapsed for removal, a space 42 is provided between longitudinal edges of segments. Over the edge of each segment is a cover strip 43 of suitable material to prevent entry of agglomerate into the interior of the unperforated portion of the core through space 42, and thus injuriously affect rotor equilibrium. This strip may be located exteriorly of recess 42 if preferred.

The reinforcement R comprises helical wire which prior to location in the rotor, is united with longitudinal members z, preserving predetermined pitch winding, by welding, for example. The longitudinal members are disposable interiorly or exteriorly of the helices, but in the latter case projections 41 hereinafter described may be disposed longitudinally instead of circumferentially, relatively to the core. Reinforcement can be positioned by means of spacing blocks 44 of suitable material and contour, secured by wires for example; and such blocks may be used where projections 41 are not convenient. To ensure that reinforcement shall be embedded in predetermined location, it is positioned by projections of suitable design. They are shown as arcs 41 (see Figure 9) carried by withdrawable formative elements, as core segments, or on ring 14 (see Figure 3), the reinforcement being sufficiently embedded in agglomerate prior to withdrawal of said elements thus preventing it being displaced or deformed. The thickness of the agglomerate outside and inside the reinforcement is determined by the distance between the mould and core in combination with the depth of the said projections, which in Figures 2, 3, 5, and 9 are shown mounted on core segments, their number and positions being determinable partly by the contour of the structure and partly by the nature, contour, and dimensions of the reinforcement.

Projections are advisable near each end of a reinforcement, and intermediately thereof as required. I show projections 41 disposed circumferentially about core segments, but they may be otherwise arranged, as longitudinally. The projections are tapered on one, or, as shown, on each side, in order that they may be removed without injuring the moulded, but not necessarily finally consolidated, agglomerate, and for collapsing purposes they are bevelled as at 41ᵃ, at one or both ends.

The projections are fixable, as by welding, or are removably attached to their support by suitable means, as screws, so as to be interchangeable and combinable to suit requirements. For contouring the surface of a structure to be made, I use a resilient or elastic element, shown by ring p of any suitable material, for example, rubber reinforced by canvas. In this instance it is arranged to contour an internal chamber, the contour being varied as required. The inner diameter of ring p is normally advantageously less than that of the exterior of part S by which it is carried. To prevent the ring becoming displaced during moulding, suitably positioned stops q are secured to any member carrying the said ring,—in this instance the end S. To facilitate removal of the ring from the moulded material after withdrawing the end S, means are provided; for this purpose a loop s is shown, pivoted to the ring by a member t part of which is embedded in ring p, the inner face of the ring p having a recess r to allow of the loop being closed down.

To prevent locked in air obstructing the complete filling of the moulding area I provide air escape holes or ports y in, but not confined to, the end S.

To produce an exterior configuration in the pipe or other structure the end D is at will contoured; when contoured as at 45 it forms an annular recess. Member S is shown with a number of ribs w which form channels or passageways x on the interior surface of the faucet for escape of surplus liquid during moulding, and similar means may be used as to other surfaces.

The rotor (Figure 1) being assembled, the operation of my invention is as follows:—

The rotor is spun at required velocity, and agglomerate is fed from opposite ends into the core.

When such material strikes a deflector 23 (Figure 3) it passes through adjacent perforations 19 into the moulding space, and travels to the extremity in each unit furthest from the feed end. Building up of the structure then proceeds retrogressively; and, as the filling of the moulding space progresses, retrogressive building lessens and it is supplemented by radial filling.

As moulding continues the agglomerate flows into the faucets, expelling imprisoned air through vents y, all moulding spaces becoming filled. On consolidation being completed, rotation is stopped, and the rings E and F are withdrawn. The deflector 23 and the ring 15 are then removed, leaving the core segments extractible, to facilitate which a lever can be inserted into recesses $o$, $o^1$, under the thickened ends 7 of said segments.

In due course the end S is removed, as by inserting a lever into recesses $o^2$, leaving the contouring ring p still in contact with plastic material. By drawing loop s towards the axis of rotation, the ring p becomes deformed, and on being grasped at each side is readily removed.

Rotation is resumed, advisedly at reduced velocity, after recesses including any holes formed in the structure surface but not further required, are filled in any obvious manner, as by hand, and the surface generally is smoothed by any suitable means. In practice a smooth coat of finishing material is then applied. The annuli aforesaid and all bolts are next removed. This leaves the moulds separable for freeing from and removal of the moulded structure. A bi-unit rotor having now been described comprising a plurality of moulds arranged symmetrically for simultaneous rotation, a single unit rotor, constructed according to this invention, provided with a balancing means, could obviously be made at will.

I claim:—

1. In the process of moulding plastic material to simultaneously produce a plurality of structures each having one or more deviations, supplying the material into respective feed spaces located opposite to and spaced apart from one another, but arranged about a common axis of rotation, each said feed space communicating with a moulding space, the axis of rotation passing through the feed portion of each moulding space.

2. In the process of moulding plastic material to simultaneously produce a plurality of structures each having one or more deviations, supplying the material into respective feed spaces located opposite to and spaced apart from one another, but arranged about a common axis of rotation, each said feed space communicating with a moulding space, the axis of rotation passing through the feed portion of each moulding space, a divergent portion of each moulding space crossing the axis of rotation, and another divergent portion rotating about said axis of rotation.

3. In apparatus for making structures of the kind described centrifugally, a moulding space formed by means which include divergent divisions of a core one of which includes the axis of rotation, the divisions being connected by jointing means which include an outer holding element which tends to contract and an inner holding element which tends to expand.

4. In apparatus for making structures of the kind described centrifugally, a moulding space formed by means which include divergent divisions of a core one of which includes the axis of rotation, the divisions being connected by jointing means which include an outer element tending to contract and embracing the meeting ends of segments of adjacent core divisions, and an inner element tending to expand pressing said ends against the outer element.

5. In apparatus for making structures of the kind described containing metal reinforcement of cage form, a segmented core carrying projections which directly contact with and retain the said reinforcement in position relatively to the core during the centrifugal operation, each projection being bevelled at one or each end to facilitate removal of the core.

6. In apparatus for making structures of the kind described, a core, portion of the length of which is perforated, with at the inner extremity of the said portion, means to deflect through perforations plastic material projected against said means.

7. In apparatus for making structures of the kind described, a core, portion of the length of which is perforated to permit plastic material to flow to a moulding space, a deflector to direct plastic material through the perforations, the remainder of the core being unperforated to constrain and guide the said material to the end of said moulding space.

8. In apparatus for making structures of the kind described, a core, portion of the length of which is perforated to permit plastic material to flow to a moulding space, a deflector to gyrate about the axis of rotation and to direct plastic material through the perforations, the remainder of the core being unperforated to constrain and guide the said material to the end of said moulding space.

9. In apparatus for making structures of the kind described, a core enclosing an area to be fed with plastic material, and a removable deflector within the core at the inner end of the said area, a moulding space enclosing the core, the apparatus being revolvable, the axis of rotation extending through that part of the core which contains the feed space.

10. Apparatus for making structures of the kind described, having a core perforated along one part of its length, with at the inner extremity of the perforated part means to deflect through the perforations plastic material projected into the core and differentially distribute said plastic material into a moulding space enclosing the core.

11. In apparatus for making structures of the kind described, a core including longitudinal separable segments and enclosing an area to be fed with plastic material, and a removable deflector within the core at the inner end of the said area, a moulding space enclosing the core, the apparatus being revolvable, the axis of rotation extending through that part of the core which contains the feed space.

12. In apparatus for making structures of the kind described, a plurality of cores having ends which extend in opposite directions, and contain feed areas, the said ends being retained in position by the pressure of resilient devices.

13. In apparatus for making structures of the kind described, a rotor including a plurality of moulding units each having moulding elements, a roller path, means uniting each roller path to a mould element, and means extending transversely to the axis of rotation connecting divergent moulding element ends.

14. In apparatus for making structures of the kind described, a rotor including a plurality of united moulding units, a part of each of which includes, and another part of each of which deviates from, a common axis of rotation, the feed entrance of each unit including the said axis.

15. In apparatus for making structures of the kind described, a contour forming element of expandible and contractible material arranged to embrace a moulding member, the said contour forming element being removable from the moulded structure by deformation, and a recess in which is housable means to facilitate the said deformation.

16. In apparatus for making structures of the kind described, a moulding space enclosed by members which includes removable end elements having air outlets.

17. In apparatus for making structures of the kind described, a rotor comprising united moulding units each having external, internal, and end means to enclose respective moulding spaces, a portion of each internal element being perforated and containing space to receive plastic material, deflecting means in each said receiving space, and extending across the axis of rotation means which connect opposed divergent ends of units holding their moulding elements in operative relationship, and means uniting mould elements to end annuli.

18. The process of moulding plastic material to produce a reinforced or other hollow structure of the kind set forth, which consists in supplying the material centrifugally to a feed space surrounding the axis of rotation of a rotor mould, causing said material to thence travel into part of a moulding space which surrounds the feed space, causing part of said material to travel along one or more curvilinear extensions of said part of the moulding space, the material being forced across the axis of rotation slidably filling the whole moulding space, and forcibly consolidating the material.

19. The process of moulding plastic material to produce a reinforced or other hollow structure of the kind set forth, which consists in supplying the material centrifugally to a feed space surrounding the axis of rotation of a rotor mould, causing said material to thence travel over a curvilinear surface into part of a moulding space which surrounds the feed space, causing part of said material to travel along one or more deviating extensions of said part of the moulding space, constraining some of the material to slidably cross the axis of rotation, the material filling the whole moulding space, and forcibly consolidating the material.

20. The process of moulding plastic material centrifugally, which consists in causing part of the material to retrogressively fill part of a curvilinear moulding space, and another part of the material to fill the curvilinear balance of the moulding space by feeding the material to the feed space through each unit.

21. The process of moulding plastic material to produce a reinforced or other hollow structure of the kind set forth, which consists in supplying the material centrifugally to a feed space surrounding the axis of rotation of a rotor mould, causing said material to thence travel into part of a curvilinear moulding space which surrounds the feed space, causing part of said material to travel along one or more curvilinear extensions of said part of the moulding space, the material filling the whole moulding space, and being caused to enter the moulding space differentially according to the quantity of material required to form different parts of the curvilinear structure, and forcibly consolidating the material.

22. The process of moulding plastic material to produce a reinforced or other hollow structure of the kind set forth, which consists in supplying the material to a curvilinear feed space surrounding the axis of rotation of a rotor mould, the feed space being limited to a part of the interior of a core, causing said material to thence travel into part of a moulding space which surrounds the feed space, causing part of said material to travel along one or more curvilinear extensions of said part of the moulding space, the material filling the whole moulding space, and forcibly consolidating the material.

23. In the process of centrifugally making a hollow structure of the kind described, feeding plastic material into an apertured core so that it centrifugally enters a curvilinear moulding space and travels along the space to an end remote from the place of entry, filling the space retrogressively from said end, further material filling the other parts of the moulding space, and forcibly consolidating the material.

24. In apparatus to centrifugally produce a hollow structure of the kind described, a rotor which includes a mould shell and a core spaced apart to form between them a curvilinear moulding space part of which surrounds the axis of rotation, and one or more parts of which diverge from said axis, and perforations in that part of the core which surrounds the axis.

25. In apparatus for making structures of the kind described centrifugally, a core having divisions forming with a moulding shell, a moulding space, the divisions diverging from the axis of rotation, and being engaged by jointing means.

26. In apparatus for making structures of the kind described centrifugally, the structures containing metal reinforcement of cage form, a core carrying circumferential projections tapered in transverse section and being in direct contact with and retain the said reinforcement in position relatively to the core during the centrifugal operation.

27. In apparatus for making structures of the kind described centrifugally, the structures containing metal reinforcement of cage form, a core carrying circumferential projections tapered in transverse section and being in direct contact with and retain the said reinforcement in position relatively to the core during the centrifugal operation, the said projections being arcuate of and integral with the core.

28. In apparatus for making curvilinear structures of the kind described, a core, part of the length of which is circumferentially perforated, the balance of the length of which is unperforated and deviates in direction from a straight continuation of the perforated part, and within the latter a feed space.

29. In apparatus for making structures of the kind described, a contour forming element of elastic material arranged to embrace a moulding member, the said contour forming element being removable from the moulded structure by deformation, and means embedded in the elastic element to facilitate the said deformation.

In witness whereof I have hereunto set my hand.

CHARLES WILLIAM WATSON.